Oct. 30, 1945. C. A. BARATELLI ET AL 2,387,821
EYE PROTECTION MEANS
Original Filed Dec. 14, 1942  2 Sheets-Sheet 1

INVENTORS
DANIEL P. BERNHEIM
CHARLES A. BARATELLI
BY WALTER LOWN
Louis L. Gagnon
ATTORNEY

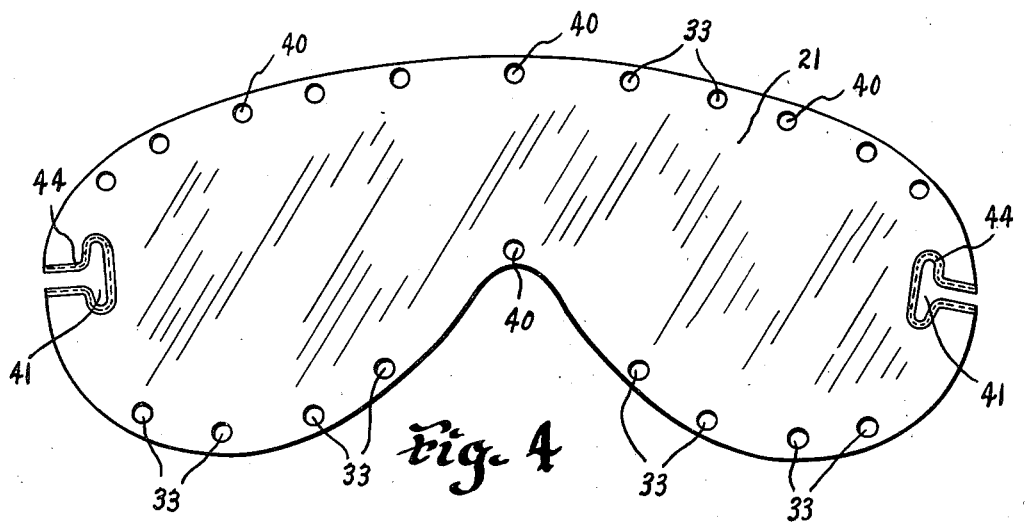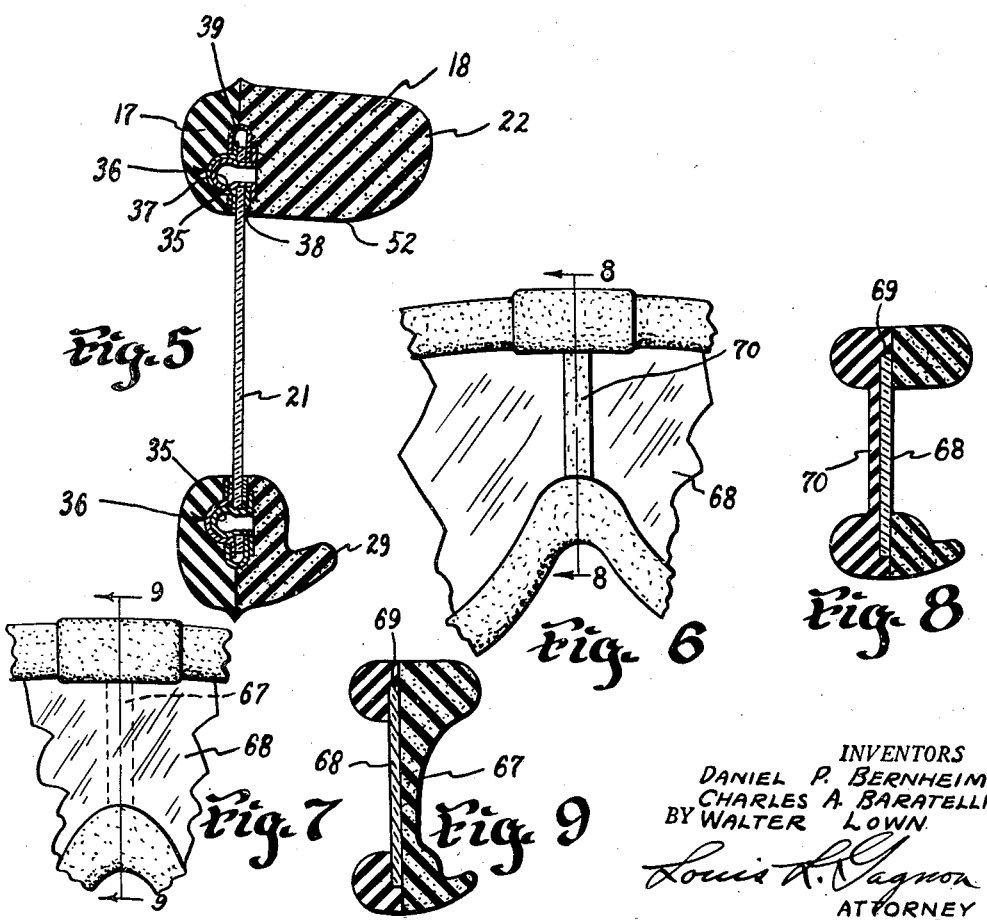

Patented Oct. 30, 1945

2,387,821

UNITED STATES PATENT OFFICE 2,387,821

EYE PROTECTION MEANS

Charles A. Baratelli, Cambridge, Daniel P. Bernheim, Southbridge, and Walter Lown, Boston, Mass., assignors to American Optical Company, Southbridge, Mass., a voluntary association of Massachusetts Original application December 14, 1942, Serial No. 469,020. Divided and this application January 28, 1944, Serial No. 520,038

4 Claims. (Cl. 2—14)

This invention relates to improvements in eye protection means. The application is a division of application Serial No. 469,020, filed December 14, 1942, in which we are named as joint inventors together with E. M. Splaine and W. H. Lehmberg.

An object of the invention is to provide novel means and method of forming a protection goggle of the type adapted for general utility which is so fabricated as to have an adherent, comfortable fit with the facial characteristics of most individuals and which will afford ease of interchanging of lenses and embody a minimum of parts.

Another object is to provide an eye protection device having a face piece formed substantially entirely of resilient material with a part of said material having more yielding characteristics and having a face formed portion shaped to the major facial requirements of the average run of individuals and being readily compressible and self-shaping to obtain an intimate fit with irregularities of facial contour.

Another object is to provide a face piece for an eye protection device of the above character formed essentially of resilient material with the part of said face piece opposed to the face-engaging portion being formed more rigid to form a framing for the lens which, through its more rigid characteristics, will tend to yieldingly retain the eye protection device in the initial shape to which it is formed.

Another object is to provide such an eye protection device with lens-receiving means adapted to removably retain an initially flat lens in a curved condition conforming to the curvature of the face piece.

Other objects and advantages of the invention will become apparent from the following description taken in connection with the accompanying drawings, wherein:

Fig. 4 is a front view of the lens;

Fig. 5 is an enlarged sectional view taken as on line 5—5 of Fig. 1;

Fig. 6 is a front view of a modification of the invention;

Fig. 7 is a view generally similar to Fig. 6 of a further modification;

Fig. 8 is a sectional view taken as on line 8—8 of Fig. 6;

Fig. 9 is a sectional view taken as on line 9—9 of Fig. 7.

Figure 2:
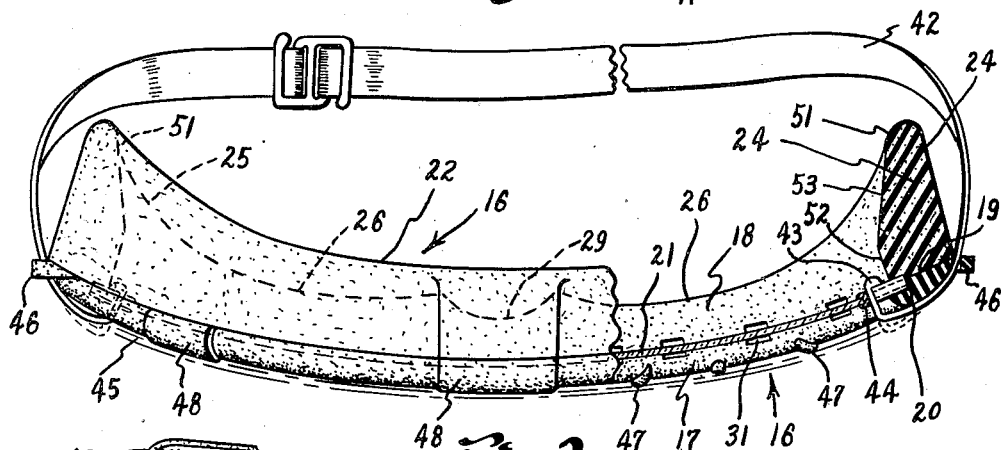
Fig. 2 is a plan view partially in section of the device illustrated in Fig. 1.

Referring to the drawings, the device embodying the invention comprises a face piece 16 including a frame-like portion 17 of resilient material such as rubber, latex, vinyl chloride, ethyl cellulose plasticized with castor oil or other suitable plasticizer or other known synthetic rubbers or other means having similar characteristics. The frame-like member 17 is formed of relatively hard material of the above nature and has secured thereto, by vulcanizing or other suitable means, a face engaging portion 18 formed of any one or more of the various materials set forth above but which has the characteristics of sponge rubber thereby being more resilient than the frame-like portion 17. The portion 18 is secured to the frame-like portion 17, as illustrated at 19, by vulcanizing or by the use of suitable cements, such as latex cement or cements having similar characteristics. The frame, comprising the members 17 and 18, is, as shown in Fig. 2, transversely curved to conform to the general transverse curvature of the face.

Figure 3:
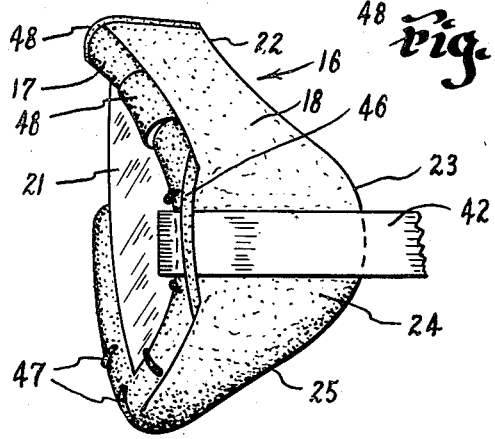
Fig. 3 is a side elevational view of said device.

The portion 17 is formed with an internal shouldered edge 20 which, when said portion 17 is secured to the portion 18 provides a continuous slot or groove throughout the frame-like portion 17 for receiving the edge of the lens 21. The lens 21 may be formed of any suitable transparent material and is preferably formed of any one of several known transparent flexible materials, such as methyl methacrylate or other artificial resin, Celluloid, or the like. The lens 21 is placed within the lens retaining groove or slot by distorting the material of the frame-like portion 17 and face engaging portion 18 and by allowing the said material to return to its initial set after the lens has been placed within the slot or groove thereby conforming an initially flat flexible lens to the initial curvature of the portions 17 and 18. The face engaging portion 18 has an upper contour edge 22 shaped to the general contour characteristics of the forehead adjacent the brow. The edge 22 curves outwardly and rearwardly and blends with the contour edge 23 of the side portions 24 of the face-piece. The edge 23 is shaped to fit the general contour of the temporal sides of the face adjacent the outer orbital brims of the eyes. The face engaging edge continues downwardly and inwardly, as illustrated at 25 in Fig. 3 and at 25 in Fig. 2, and blends with the lower contour edges 26 of the facepiece which are shaped to fit the general contour shape of the cheekbones below the eyes. The facepiece 18, as illustrated at 27 in Fig. 1, is shaped to provide a nasal recess 28 with the face engaging portion 18 having a face engaging edge 29, at said location, shaped to fit the general contour characteristics of the bridge of the nose.

The complete face engaging portion of the member 18, therefore, is initially shaped to fit the general facial characteristics of most individuals throughout the contour of the eyes.

Figure 1:
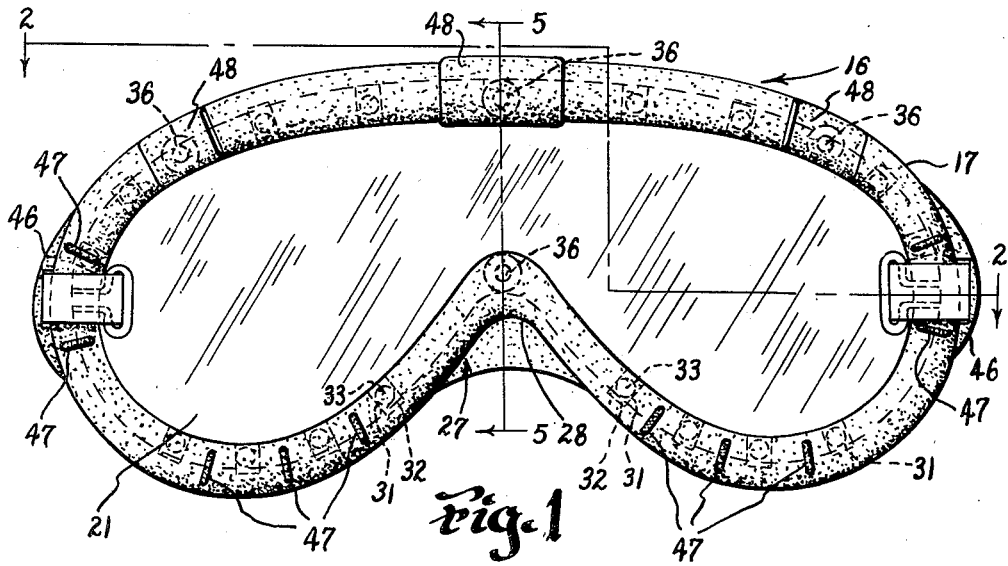
Fig. 1 is a front view of the eye protection device embodying the invention.

In order to ventilate the goggle, the lens receiving slot or groove resulting from the shouldered portion 20 is provided, at spaced intervals, with a plurality of recesses 31, illustrated by the dash lines in Fig. 1. The recesses 31 are considerably wider than the width of the slot for receiving the lens and extend below or above the base of the lens receiving slot as illustrated at 32. This provides a clearance between the base of each recess 31 and the adjacent edge of the lens whereby air entering the recess 31 from the front of the lens may pass through the space 32 inwardly of the facepiece 18 to the rear side of the lens. To insure more positive ventilation, the lens 21 is provided with openings 33 spaced a distance apart substantially equal to the distance between the corresponding recesses. Air entering the recesses 31 will pass about the edge of the lens through the space 32 and will also pass through the openings 33 in the lens.

The lens 21 (Fig. 4) is also provided adjacent its periphery with openings 40 which are adapted to fit over the male portions 35 of suitable snap fasteners or the like 36, see Figs. 1 and 5. The male portions 35 are secured to and carried by the facepiece 18. Each snap fastener also has a female portion 37 carried by the frame-like member 17. Each of said male and female portions is carried by a web 38 which assists in retaining the said male and female portions in proper aligned relation with each other and also aids in attaching the said portions to the facepiece. The attachment may be through the use of suitable latex, cement or other suitable means. It is to be noted that the web 38 forms a hinge-like portion 39 which, when the female member is snapped free from the male member 35, permits the lower edge of the groove portion of the frame-like member 17 along with said female portion to be twisted in an outward direction to permit the portion of the lens 21 having the connection opening therein to be fitted over the male member and the lens to be secured inwardly of the lens retaining slot or groove at the location of each of the respective snap fasteners 36.

The lens 21, in order to provide headband attachment means, is provided with T-shaped slots 41 on the opposed sides thereof. The slots are preferably formed T-shaped in order to afford ease in attaching the headband 42 thereto. The headband 42 has enlarged portions 43 adjacent the ends thereof attached to the T-slots and the ends are located in the T-slot by threading the same inwardly of the T-shaped slot from the open side thereof.

In order to reinforce the T-shaped slotted portions the edges of said slotted portions are provided with a metal binding or an integral bead or the like 44.

In order to retain the ends 43 in proper fitted relation in the T-shaped slots 41 and to aid in preventing the facepiece 16 of the goggle from rotating or tilting forwardly or rearwardly when suspended by the headband, the face piece is provided, on the temporal sides thereof, with slotted integral portions 46 through which the headband 42 is threaded.

This causes the facepiece to be of greater gravital weight below a horizontal suspension line extending through the integral slotted portions 46 thereby preventing the said facepiece from tilting forwardly and rearwardly relative to the headband when suspended by said headband. The slotted portions 46, as shown in Fig. 2, also aid in retaining a cover glass or the like 45, as illustrated by the dot and dash lines, in relatively intimate relation with the front of the facepiece. This is because of the fact that the slotted ends of the cover glass are retained between the anchored ends 43 and the portions threaded through the slots 46.

The member 45, although termed a cover glass, is preferably formed essentially of the same material as the main lens portion 21 and is provided with slots adjacent the opposed sides thereof through which the headband 42 is threaded in a manner simulating the connection of said headband with the main lens 21. The cover glass may be an auxiliary protection lens used jointly with the lens 21, which may be of a different color or of different light absorptive characteristics than the main lens portion as to infra-red or ultra-violet rays or may be formed of material possessing light-polarizing characteristics. Such polarizing material may be of any of the light-polarizing materials sold under the trade name "Polaroid."

The framing 17 is provided with a plurality of integral lugs or spacer members 47 and 48 on the face thereof to provide ventilation between the cover glass and said framing.

The facepiece 18, in its function of compensating for slight irregularities in the facial contours of different individuals, has a tendency to compress in the direction of the thickness of the material as distinguished from most prior art facepieces which have a tendency to roll or bend under pressure introduced by the pull of the headband. The sponge rubber face engaging portion 18, when the face engaging edge engages the face, is initially fitted to the general facial contours and compresses to compensate for slight irregularities in the face. This altering changes the distance between said face engaging edge and the line of the plane of the lens when compensating for said irregularities. The integral lip portion 29 flexes in a sidewise direction to compensate for the irregularities of the nose. This, therefore, is not the same compression function as set forth above, but rather is a function of the bending of the lip in a sidewise direction rather than a compression of the material of the lip.

It is to be noted, however, that the facepiece 18 in its entirety is such that it has edge contact with the face throughout the lower and upper contour edges 22 and 26 respectively thereof, which edges are at a relatively short distance from the plane of the lens as compared with the side portions 24. The side portions 24 have substantially side surface contact with the sides of the face which is indicated by the reference numeral 51 in Fig. 2. The side portions 24 extend rearwardly of the lenses a distance considerably greater than the distance between the edge 22 and the plane of the lens. The edge 22, however, is at a greater distance from the plane of the lens than the lower edge 26. This causes the lens to tilt forwardly on the nose with the lower edge of the lens being closer to the eyes than said upper edge when the device is in position of use on the face.

The facepiece is in the form of continuous eyecup members shaped to fit intimately with the face throughout the entire contour edge of the lens with the lens being formed of continuous sheet material. In order to insure a wide field of vision throughout said facepiece the inner walls 52 are angled outwardly with respect to the inner wall 53 thereof throughout the upper portion and sides of the facepiece. The angle of the inner surface 52, throughout the upper portion of the facepiece, is best illustrated in Fig. 5. In view of the fact that the lower contour portions of the facepiece are relatively narrow, such angling of the wall is not necessary.

In Figs. 7 and 9 there is shown a modification in which the upper and lower portions of the facepiece, centrally thereof, are provided with an integral connecting web 67 which functions in place of the snap fasteners of the embodiment previously described to removably maintain the lens in the groove. The web 67 being formed of resilient material may be stretched during the insertion of the lens 68 in the lens receiving groove or slot 69. The tendency of the web 67 to return to its initial set thereby locks the lens within the groove 69. In this instance, the web 67 is in the rear of the lens. In Figs. 6 and 8, a similar web 70 is shown. In this instance, the web 70 is in the front of the lens and functions in a manner generally similar to the web 67.

Although it is preferable that the facepiece be formed with a front frame-like portion of resilient material inherently harder than the rear face engaging portion thereof, as shown throughout the various views, the front frame portion may be formed of material other than rubber and may be formed relatively rigid and yet accomplish the results desired. In this particular instance, the lens would be inserted in the lens receiving groove by distorting the inner portion of the facepiece. It is preferable, however, that the front framelike portion 17 be formed of material having distortable characteristics.

We claim:

1. Goggles comprising a frame of resilient material having a lens supporting seat shaped to receive a lens of a size and shape to extend over both eyes of the wearer, said frame having sufficient body to maintain of itself a predetermined curvature and being curved transversely to conform to the general curvature of the face, an initially flat lens of flexible material of said size and shape, and means for removably securing said lens to said seat with the lens held to the curvature of the frame.

2. Goggles comprising a frame adapted to fit about the eyes of the wearer and shaped to receive a lens of a size and shape to extend over both eyes of the wearer, and a flexible lens member of said size and shape fitting said frame, said frame having sufficient body to maintain of itself a predetermined curvature and being curved transversely to conform to the general curvature of the face, said frame being grooved to receive the peripheral edge of the lens member, and means carried by the frame for releasably retaining the lens in the groove with the lens held to the curvature of the frame, at least one wall of said groove being deformable to permit ready removal of the lens member.

3. Goggles comprising a frame of resilient material adapted to fit about the eyes of the wearer and shaped to receive a lens of a size and shape to extend over both eyes of the wearer, said frame being curved transversely to conform to the contour of the face, an initially flat lens member of flexible material of said size and shape, a groove in the frame for receiving the peripheral edge of said lens member, and attachment means cooperating with openings in the lens member for removably retaining the lens in the groove with the lens held to the curvature of the frame.

4. Goggles comprising a frame of resilient material having a lens supporting seat shaped to receive a lens of a size and shape to extend over both eyes of the wearer, said frame having sufficient body to maintain of itself a predetermined curvature and being curved transversely to conform to the general curvature of the face, an initially flat lens of flexible material of said size and shape, and means for removably securing said lens to said seat with the lens held to the curvature of the frame, said last-named means comprising a resilient web joining the upper and lower portions of the frame substantially intermediate the ends thereof.

CHARLES A. BARATELLI.
DANIEL P. BERNHEIM.
WALTER LOWN.